(No Model.)
J. C. UHLER.
Stock Clearance Indicator.
No. 237,643. Patented Feb. 8, 1881.
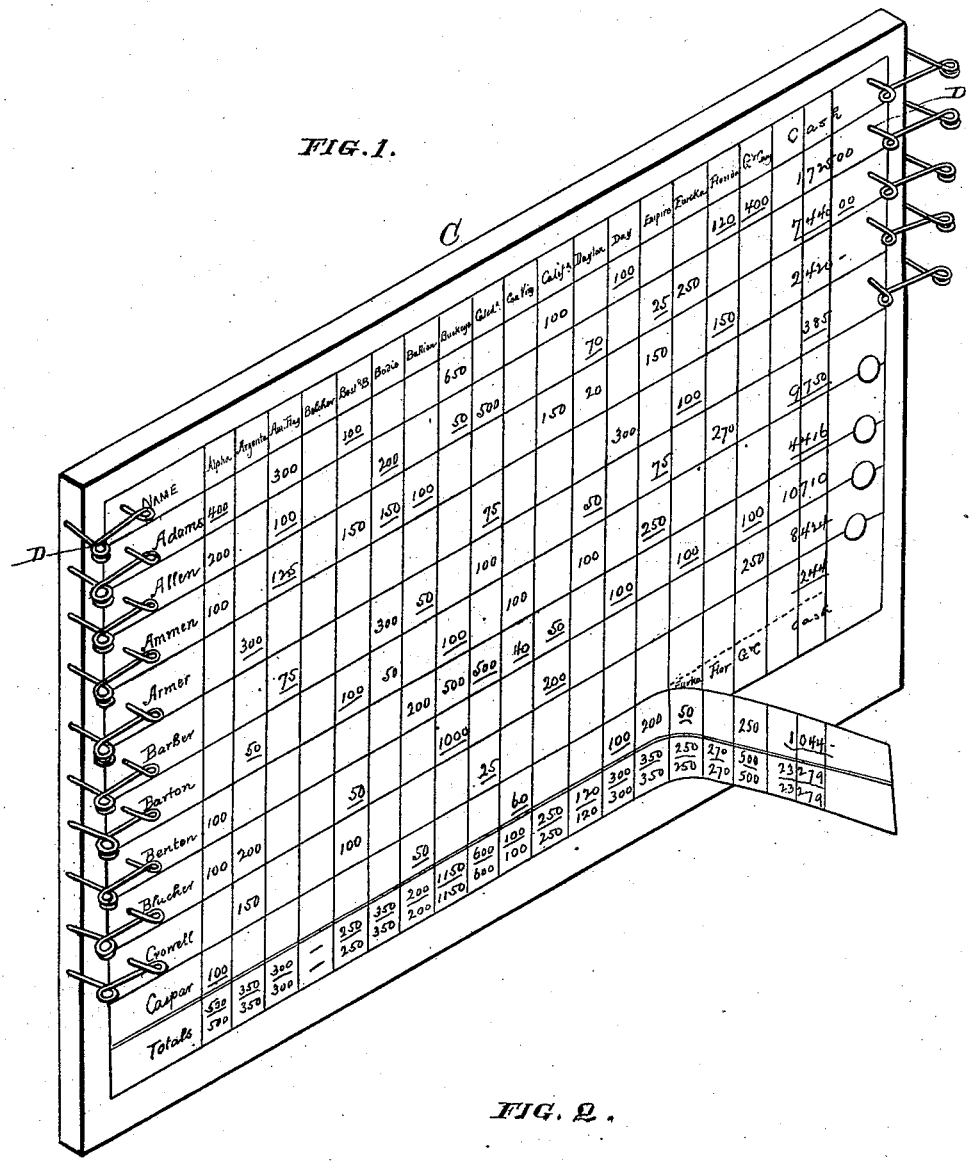
WITNESSES
Frank H. Brooks
Geo. H. Strong.
INVENTOR
J. Clemt Uhler
By Dewey & Co.
Attys

UNITED STATES PATENT OFFICE.

J. CLEMENT UHLER, OF SAN FRANCISCO, CALIFORNIA.

STOCK-CLEARANCE INDICATOR.

SPECIFICATION forming part of Letters Patent No. 237,643, dated February 8, 1881.

Application filed December 29, 1880. (No model.)

*To all whom it may concern:*

Be it known that I, J. CLEMT. UHLER, of the city and county of San Francisco, and State of California, have invented an Improved System and Apparatus for the Clearance of Securities and Money; and I hereby declare the following to be a full, clear, and exact description thereof.

The object of my invention is to provide a system and apparatus by means of which the clearance of the transactions of stock-brokers may be effected, the settlement of differences in the delivery and the receipt of stocks bought and sold being done by a common agent by a single adjustment of balances.

In the ordinary method of transacting the business of buying and selling stocks all stocks bought on one day are received and paid for the next day by a separate check drawn for each purchase. All stocks sold are also delivered in as many lots as there are different transactions, and as many separate checks are drawn to pay for these. For instance, A buys twenty lots of stocks from B, C, et al., and B, C, et al. send the twenty separate lots of stocks to A's office and get twenty separate checks for the various amounts. The same day A sells nineteen other lots of stocks to the same men— B, C, et al.—and his clerks are sent around to the nineteen offices with separate lots of the various stocks, returning with nineteen checks. These have to be collected or deposited, if received in time for the bank clearing, all of which involves considerable time and labor.

A clearing system enables the broker to send the differences only of the stocks bought and sold to the one office, which is called the "clearing-house," get his check for the balance due him, and thus perform his whole day's business in perhaps an hour. A system of clearing which answers for banks, however, is inadequate for brokers, since in the case of banks there is only one currency to be cleared, whereas in the case of brokers there may be fifty or a hundred, as, besides the currency of the banks, (cash,) each different stock becomes a currency for the purpose. As the number of brokers also may be three hundred or five hundred, or more, and it is absolutely necessary that the clearing should be made within the same time occupied by the banks for the same purpose to be practicable, the large amount of work necessary to be done within a very short time and the injurious consequences of a failure in its operation for a single day have rendered systems heretofore proposed inadequate for the purpose.

In other systems the members of the clearing-house are required to send in at a certain hour of each day a full statement of their business, showing the balances due from or to them. These statements have to be copied onto other forms by the clerks of the clearing-house, in order to establish the adjustments for the body of members. This involves the labor of a considerable force of clerks and a loss of time. There is also liability of error, the detection of which may block the wheels of business of several hundred officers for an hour or more.

My invention consists in providing a series of correspondingly-made slips bearing the names of the different stocks, upon which each broker, while in his office, makes his statement of differences in each stock and in cash, and these various slips, uniform in ruling and dimensions, when brought together and placed one above another, form immediately the clearing-house sheet, showing the general statement upon which the adjustment of balances and settlement of differences are made.

It further consists in an apparatus for controlling and exhibiting these different slips as a whole, and in certain details of arrangement more fully described in the accompanying drawings.

Figure 1 shows the tablet and the completed sheet. Fig. 2 is a view of one of the separate slips.

Let A represent one of these slips, which is cross-ruled, as shown, and has on its edge, in the ruled squares, the names of the various securities in which transactions occur. Each of these names represents one of the stocks listed on the board. At the space B on the left-hand side of the sheet is the name of the broker to whom the particular slip belongs.

Each broker in his own office, before coming to the clearing-house, makes up his statement on his slip, where he has plenty of time to get it correct beyond the possibility of an error. He simply puts under the name of each stock the figures which represent the differences in his transactions—that is to say, if A has bought four hundred shares of the same stock, he puts down in the proper square, in red ink, the figures "100," showing that he has to deliver one hundred shares of the said stock. Another broker, B, who sold four hundred shares of the said stock and bought five hundred shares, puts down in the proper column, in black ink, the figures "100," showing that he is to receive from some one one hundred shares of said stock. I have indicated my colored figures in the drawings by drawing a line under them. When, therefore, all the slips are put together and form a whole, A will deliver his one hundred shares of said stock to the clearing-house clerk, who will deliver said one hundred shares to B, whose slip calls for them. The transactions of the buying and selling of the eighteen hundred shares is thus adjusted by the delivery of the one hundred shares and a check in payment for the said one hundred shares. All of these slips, when brought to the clearing-house by the different brokers, are handed to the clearing-house clerk. This clerk is provided with a tablet, C, with snaps D on each edge. The separate slips are placed one below the other on the tablet and held by the snaps. When all the slips are in position they form, combined, a single sheet, which shows the sum total of all the transactions in each stock of each individual broker. This forms the clearing-house sheet. As each slip has previously been proven correct, the whole sheet is sure to be correct without the loss of time and labor in ascertaining it. By this means the business of fifty brokers in fifty stocks, including cash transactions, may be performed on the single sheet of paper formed by the combined slips in a few minutes.

Where any system of this character is in operation the sheets are made up in the clearing-house, each having the transactions in a few stocks only. One-half of the sheet is occupied by stocks "to be received" and the other by stocks "to be delivered." Thus the balances in each stock are represented in two columns, and at such wide distances apart that there is liability to error in striking balances. In my system the stocks "to be delivered" and stocks "to be received" are expressed in the same column. This is done by expressing the stocks to be received in black ink and the stocks to be delivered in red ink. The clerk adds up the column vertically, adding the red and black figures separately. The sum total of all the figures in red under each stock must equal the sum total of the figures in black. This addition is all the clearing-house clerk has to do to prove the sheet correct. All the other labor necessary is the actual receipt of certain stocks and money from certain members and the delivery of the same (in different proportions) to the others.

It will be seen that by this system the business of clearing stocks is very much facilitated, and that the labor in the clearing-house is comparatively light and takes little time. It is the individual brokers who really make up the adjusting-sheet in their offices, where they have plenty of time, and where all possible errors may be discovered and corrected, and not left to be discovered in the clearing-house, where time is too valuable. Each broker, in preparing his slip, enters in the last column on the right (represented at D) the cash difference between his total purchases and total sales. In case he has bought more than he has sold he will be indebted for the difference to some other parties, unknown to him, but shown on the clearing-house sheet, represented by the combined slips, as described. In this case he enters the amount in red ink, and with the slip pays this amount in cash or by check. In case he has sold more than he has bought the difference in amount is entered in black ink, which shows this amount is due to him, and which the clearing-house pays over to him upon the adjustment of all the balances. By this system transactions both in stocks and cash are cleared at once.

There can, of course, be no purchases without sales or sales without purchases, and therefore the footings of the columns must be equal in both colored inks and balance each other. The sum totals in the right-hand column, D, in red ink must also equal the sum totals in black ink, since the prices of each purchase and its corresponding sale must be the same. The separate slips, therefore, when all combined to form one sheet, as described, show the whole transactions of the day's business, with very little clerical labor in the clearing-house, where time is a great object.

Having thus described my invention, what I claim as new, and desire to secure by Letters Patent, is—

In combination with a series of slips, each containing the names of securities and the individual making the slip and the amount of the difference of the security bought and sold, the tablet C, provided with snaps or holding devices D, whereby said slips may be united to form a single continuous sheet, upon which a general adjustment of balances may be effected, substantially as and for the purpose herein described.

In witness whereof I have hereunto set my hand and seal.

J. CLEM. UHLER. [L. S.]

Witnesses:
S. H. NOURSE,
FRANK A. BROOKS.